United States Patent

Moeller

[11] Patent Number: 6,127,796
[45] Date of Patent: Oct. 3, 2000

[54] METHOD AND DEVICE FOR DRIVING A SELF-TIMING STEPPING MOTOR

[75] Inventor: Siegfried Moeller, Rottweil, Germany

[73] Assignee: BDT Buro-und Datentechnik GmbH & Co. KG, Saline, Germany

[21] Appl. No.: 08/903,540

[22] Filed: Jul. 30, 1997

[30] Foreign Application Priority Data

Aug. 22, 1996 [DE] Germany .......................... 196 33 740

[51] Int. Cl.[7] .................................................. G05B 19/40
[52] U.S. Cl. ............................................ 318/685; 318/696
[58] Field of Search .................................. 318/685, 696, 318/254

[56] References Cited

U.S. PATENT DOCUMENTS

| | | | |
|---|---|---|---|
| 4,328,450 | 5/1982 | Gabor | 318/685 |
| 5,245,359 | 9/1993 | Ito et al. | 318/696 |
| 5,467,173 | 11/1995 | Sakata et al. | 318/696 |
| 5,793,177 | 8/1998 | Chia | 31/685 |

FOREIGN PATENT DOCUMENTS

| | | |
|---|---|---|
| 3708157A1 | 2/1988 | Germany . |
| 4013583C2 | 2/1992 | Germany . |
| 4241502A1 | 6/1993 | Germany . |

*Primary Examiner*—David Martin
*Attorney, Agent, or Firm*—Foley & Lardner; Bernard L. Kleinke

[57] ABSTRACT

For driving a self-timing stepping motor which can be decelerated by an external load, a driving device presets a target step frequency and the motor is started with this target step frequency. The actual rotational speed of the stepping motor is determined and, as a function of this determined rotational speed, the target step frequency is changed when the rotational speed falls below a preset actual rotational speed of the stepping motor for a preset time interval.

12 Claims, 3 Drawing Sheets

METHOD AND DEVICE FOR DRIVING A SELF-TIMING STEPPING MOTOR

TECHNICAL FIELD

The invention relates to a method for driving a self-timing stepping motor and a device for carrying out such method.

BACKGROUND ART

A method for driving a stepping motor is described, for example, in German patent publication DD 279 988 A1. Therein, a circuit configuration for the control of a self-clocked stepping motor drive for components, for example printers, is disclosed in which a constant positioning speed must be attained and the start-up and deceleration phase is realized with a maximum motor moment. The driving circuit for the stepping motor, which drives for example the print carriage of a printer, derives from the signals of the motor timing, in real time, driving signals for the winding switch-over of the stepping motor. Through the combination of a stepping motor with a timing system, data about the execution of the driven motor steps is available and as a function of these timing data the selection of the winding can take place such that the particular required motor moment is attained. In order to accelerate the print carriage, as is required in the case of fast printers, in an extremely short time and after a very short print carriage path, to the maximum print carriage speed, a target frequency is set by the driving device to which the stepping motor attempts to accelerate. In operation of the stepping motor drive with impressed load, this target frequency is not achieved, however, and the stepping motor drive rotates without step loss at reduced real step frequency. The detection of the real step frequency at which the stepping motor rotates under load is not addressed in the publication DD 279 988 A1.

However, circumstances are conceivable in which the real step frequency is to be determined when the rotational speed of the stepping motor exceeds or falls below a given speed threshold. This is the case, for example, whenever via a driving device the stepping motor drive is driven at a desired frequency, to reach the target speed. However, due to the condition on load the stepping motor, the stepping motor is more or less strongly decelerated and the occurrence of this load condition is to be determined. This can be the case with document or sheet front-feed devices in which a stepping motor drive is connected to transfer rollers, and the document or sheet is output by only one sheet output unit at a given speed. With the acquisition of the sheet, the load condition occurs.

The invention therefore has the goal of further developing said method such that the load condition can be determined. In addition, the invention has the goal of attaining a device, and circuit configuration, for carrying out such method.

SUMMARY OF THE INVENTION

Therefore the principal object of the present invention is to provide a new and improved method for driving a self-timing motor, and a device therefor.

The method includes starting a stepping motor using a preset target step frequency. After the stepping motor is started using the preset target step frequency, the actual rotational speed of the stepping motor is acquired by a driving device and, as a function of this acquired rotation speed by the driving device the further driving of the stepping motor is controlled. If the rotational speed falls below a given threshold, this indicates that the stepping motor rotates under load, which can be taken into consideration in the subsequent driving of the stepping motor.

In a preferred further development of the method according to the invention, the following method steps are provided for the driving of the self-timing stepping motor:

starting the stepping motor using a preset target step frequency until the motor rotates at a corresponding speed V4, selecting at least one detection threshold V3 which is lower than the speed V4, and a second target step frequency with a corresponding speed V5 which is greater than the speed V4, recognizing whether the detection threshold V3 has been fallen below for a given length of time due to an impressed external load applied to the stepping motor, setting the second target step frequency as soon as the detection threshold V3 is fallen below for the given length of time, automatically running-up the stepping motor to the speed corresponding to the second target step frequency V5, after the impressed external load has been removed from the stepping motor.

The invention is predominantly applied into document stacking devices associated with printers or copiers, in which, due to differing operating parameters, different ejection speeds for documents are possible. No electrical communication exists between the stacking devices and the printers or copiers. The stacking device adapts independently the document transfer speed to the real ejection speed, and must detect the length of the documents.

BRIEF DESCRIPTION OF DRAWINGS

The invention will be explained in further detail in the following embodiment example with reference to the drawings, wherein.

BEST MODE FOR CARRYING OUT THE INVENTION

A document stacking device accepts without electrical communication with a printer or copier, the printed documents of the printer or the copies of the copier, and deposit them such that they are collated. The deposition can take place on a simple stack as well as in different stacking trays where special function elements of the document stacker unit optionally deposit the documents with the printed side up or down.

Depending on the type of the printer or copier and their operating conditions, the output speed of the printer/copier can fluctuate within a broad range, for example 30 mm/s to 150 mm/s. For the cited function elements of the document stacking device for transporting the documents into specific stacking trays, and for the turning mechanism for the documents for their deposition with the printed side up or down, it is required to transport the documents in the stacking device markedly faster than the output speed of the printer/copier and to receive information about the document length, which can be within the range of 210 mm to 432 mm depending on the document format used.

Figure 1:
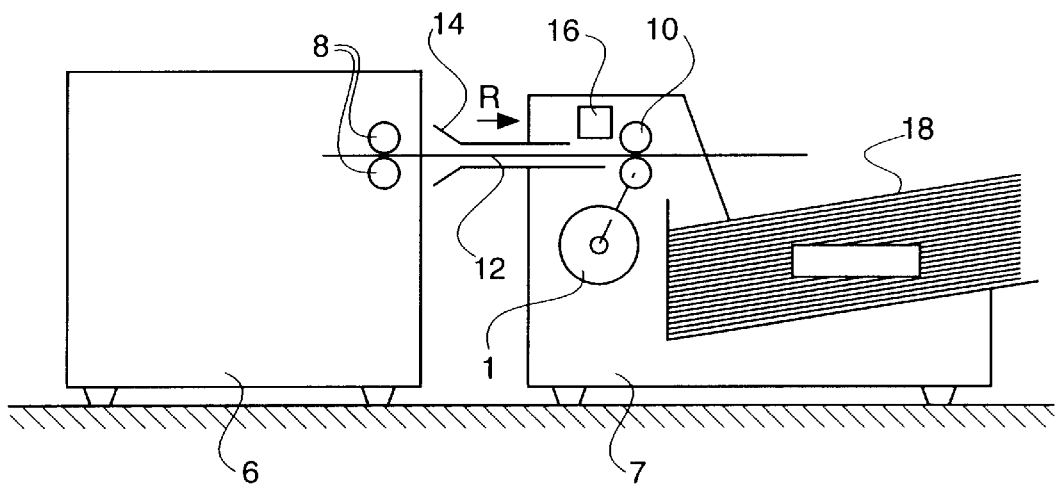
FIG. 1 is a diagrammatic view of a device configuration showing a printer or copier in connection with a document stacking device, on which the printed documents can be stacked in order.

FIG. 1 shows the spatially adjacent placement of a sheet output device 6, implemented as a printer, copier or the like. For the sake of simplicity, only two ejection rollers 8 are shown. Between these ejection rollers 8, a sheet imprinted by the printer, copier or the like, is output. As is further shown in FIG. 1, this sheet denoted by the reference number 12, is transported via a sheet guide 14, for example a rail, into a sheet front-feed device 7, which can be for example a document stacker unit in which the sheets are stacked, sorted, turned or further transported in other ways. The sheet front-feed device 7 shows schematically two transfer rollers 10, between which the sheet 12 can be received, as well as a sensor device 16, which, with respect to the sheet front-feed direction R, is disposed in front of the transfer rollers 10. The transfer rollers 10 are driven by a stepping motor 1. In the embodiment example shown, the sheets 12 are stacked one on top of the other in a document stack 18. Between the sheet output device 6 and the sheet front-feed device 7, no electrical connection exists so that no data communication between the printer, the copier or the like, and the document deposition device is possible.

The stepping motor 1 is selected for driving the transfer rollers 10 of the document stacker unit 7 to acquire the document length, and for accelerating the document in the shortest possible time after the runout from the ejection roller 8 of the printer 6 or copier, and potentially transport the document in the opposite direction for a given path.

Since the driving speed of the transfer rollers 10 must adapt automatically to the ejection speed, according to the invention a timing-guided stepping motor drive is selected wherein the encoder 2 (FIG. 3) supplies two encoder signals shifted in phase by 90°, whose periodicity is adapted to the magnet wheel angle load angle of the stepping motor 1 such that with the corresponding adjustment of encoder 2 to the stepping motor 1, the driving signals PHA/PHB for driving the power output stages 3 are directly derived through a defined time delay from the encoder signals.

This method, which is described in further detail in the publication DD 279 988, which is expressly incorporated by reference to this document, ensures that the phase signals PHA/PHB only assume the particular level for the next step if the rotor of the stepping motor 1 has executed the preceding step. Consequently the stepping motor drive can be overloaded without a step loss occurring.

The motor moment, and thus the tensile force, on document 12 via the transfer rollers 10 of the document stacker device 7, are presettable via the phase currents of the stepping motor 1.

Figure 2:
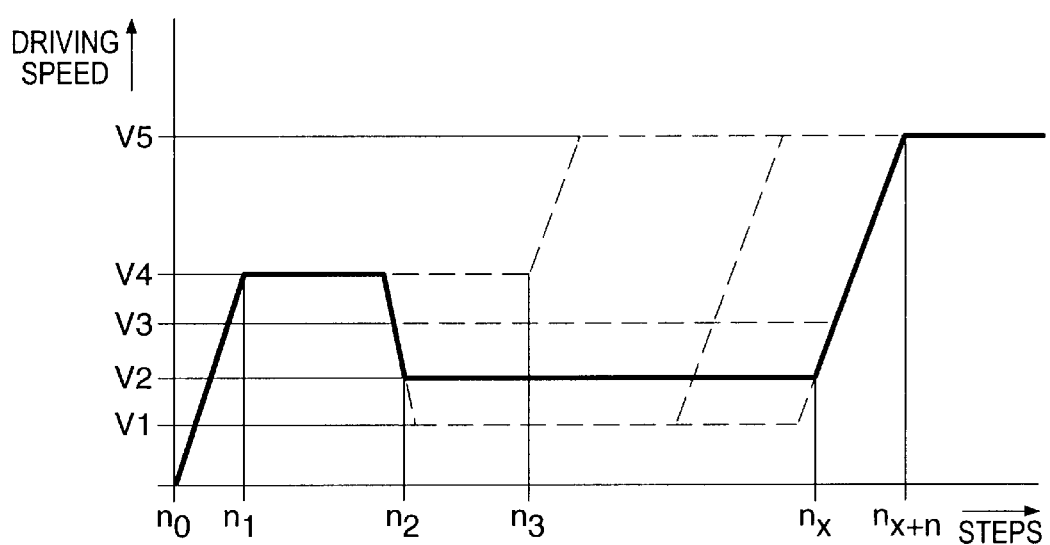
FIG. 2 is a graphical view of possible profiles of driving speeds of the stepping motor of the document stacking device.

In FIG. 2 the profile of the driving speed of the stepping motor 1 is depicted, wherein one driving speed is preset for the stepping motor 1 as a target driving speed which is indicative of the document speed when running into the transfer rollers 10 of the document stacker device 7 and after the document 12 has left the ejection rollers 8 of the printer/copier 6.

The document 12 is ejected from the printer/copier 6 for example at a speed V2=100 mm/s. Associated with this document speed is a step frequency of 126 Hz.

If the document 12 runs at an output speed V2=100 mm/s into the document stacker device and reaches the run-in sensor, the stepping motor 1 for driving the transfer rollers 10 is started. For the stepping motor 1, a step frequency of for example 380 Hz is set which translates to a driving speed of V4=300 mm/s for the transfer rollers 10.

The stepping motor 1 reaches the driving speed V4 after $n_1$ steps, wherein generally $n_1$<5 motor steps. After $n_2$ motor steps, the document 12 has reached the transfer rollers 10, and the driving speed of the transfer rollers 10 is decelerated by the document 12 from V4=300 mm/s to V2=100 mm/s. During the deceleration from V4 to V2, the detected speed is less than V3, which indicates that the document 12 has been grasped by the transfer rollers 10. When the speed falls below V3 the document stacking unit 7 starts to count the steps of the stepping motor. If $n_3-n_2$ motor steps were run at a driving speed less than V3, the target driving speed for the document stacking device 7 is increased for example from V4=300 mm/s to V5=640 mm/s.

However, initially the document 12 cannot be drawn in faster than at the ejection speed of the printer or copier. When document 12 has left the printer/copier 6 after $n_x$ steps, the drive accelerates independently to the driving speed V5 which is attained after $n_{x+a}$ motor steps.

In this acceleration phase the drive speed exceeds the detection speed V3, which indicates that document 12 has left the printer/copier 6. During the time the document 12 runs into the transfer rollers 10, to the time it runs out of the run-in sensor 16, plus a fixed step number, the document length, and thus the document format, can be derived.

FIG. 2 shows furthermore that the printer ejection speeds and the document formats can be varied within broad limits.

Figure 3:
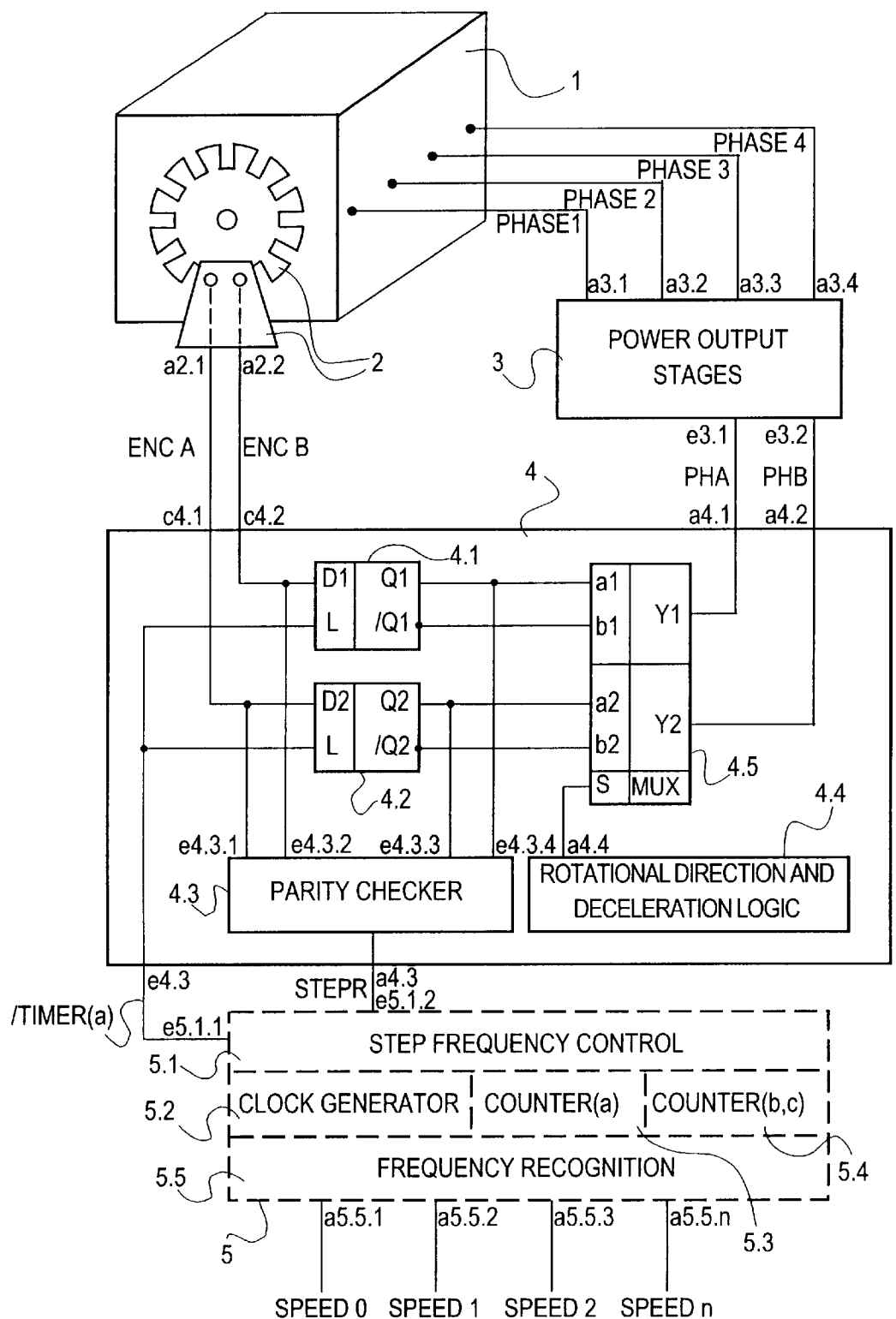
FIG. 3 is a diagrammatic view of discrete circuit complexes of a device according to the invention for controlling an encoder-controlled stepping motor with two encoder signals shifted in phase by 90°.

Apart from the known circuit structure for driving a timing-guided stepping motor with two encoder signals shifted by 90° with respect to phase, FIG. 3 shows in further detail the function details for the step frequency control and frequency recognition according to the invention.

Figure 4:
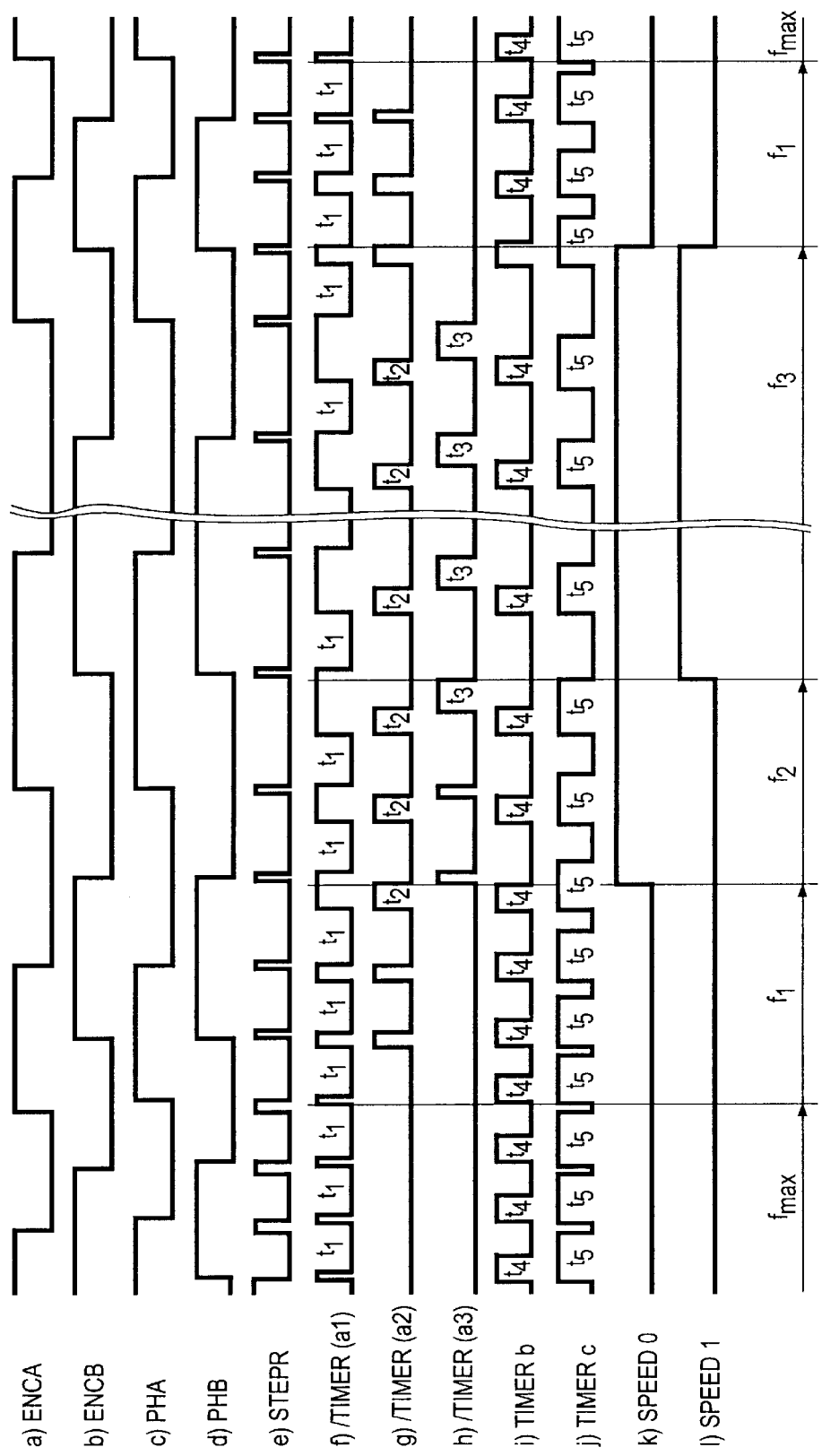
FIG. 4 is a graphical view of typical signal traces for acquiring phase signals PHA/PHB from the encoder signals ENCA/ENCB and a representation of acquiring signals SPEED 0 and SPEED 1 as speed criteria from a counter (a) with the signal/TIMER (a), respectively from additional counters (b, c) with the signals TIMER (b, c) as a function of the overload of the stepping motor as shown in FIG. 3.

The associated signal traces are depicted in FIG. 4.

The phase signals PHA/PHE (lines c, d) (FIG. 4) are derived directly from the encoder signals ENCA/ENCB (lines a, b) through a defined time delay introduced by the signal/TIMER (a1) (line f). The defined time delay is the time $t_1$, for the signal/TIMER (a1) of counter (a) 5.3 (FIG. 3), after the execution of a step indicated through the H/L-edge of signal STEPR (line e). The time LOW $t_1$ of signal/TIMER (a1) determines simultaneously the step time for the maximum target step frequency.

If the stepping motor 1 runs at the target step frequency which it has attained, for example, in FIG. 2 after the step number $n_1$, the corresponding changes of the encoder signals always occurs before the expiration of time LOW $t_1$ of signal/TIMER (a1).

Each change of an encoder signal is detected via the parity checker 4.3 (FIG. 3), and the signal STEPR is switched to High as a consequence. Thus the signal STEPR comprises information about the time for a change of the encoder signals ENCA/ENCB, and information regarding when a new step has been driven via the phase signals PHA/PHB.

In the running ranges denoted in FIG. 4 by $f_1$ $f_2$, and $f_3$, the stepping motor 1 cannot attain the preset target step frequency $f_{max}$ due to an impressed overload. In these running ranges the time LOW $t_1$ of signal/TIMER (a1) is already expired before the next change of the encoder signals ENCA/ENCB occurs. Since it is important for the drive of the transfer rollers 10 of the document stacker unit 7 to detect when the document 12 runs into the transfer rollers 10, the detection speed V3 was defined to correspond, for example, to a document speed of 225 mm/s and a step frequency of 285 Hz.

In FIG. 4 two different solutions for recognizing the detection speed V3 are provided.

In a one counter system, for example counter (a) (FIG. 3), is available for the step frequency control and frequency recognition, the counter (a) is started immediately anew after passage of time $t_1$, wherein a time $t_2$ and an output signal TIMER (a2) can be obtained.

If during time $t_2$ of signal TIMER (a2) a change of the encoder signals ENCA/ENCB occurs, the counter(a) is stopped and again started with time $t_1$ immediately after the H/L transition of signal STEPR, which has acknowledged the step execution. The range in which the stepping motor 1 runs slower than $f_{max}$, but time $t_2$ has not yet passed, is denoted in FIG. 4 by $f_1$. If the stepping motor 1 runs so slowly that time $t_2$ of counter (a) has expired, the detection speed has fallen below and signal SPEED 0 (line k) changes the level, for example from logic low to high. This range is designated with $f_2$ in FIG. 4. If a further reduction of the real step frequency occurs, the counter (a) can after passage of time $t_2$ be again started with, for example, time $t_3$. If the time $t_3$ expires before a change of the encoder signals occurs, a further frequency range is detected and, for example the signal SPEED 1 (line 1) is switched from low to high. This speed range is denoted in FIG. 4 by $f_3$.

If several counter systems are available for step frequency control and frequency recognition, the counter (a) for example can be used exclusively for the step frequency control. Additional counters, such as counters (b, c), can then realize the time criteria depicted in FIG. 4 (lines i, j).

In the manner shown the counters b and c are started for example after passage of time $t_1$ of counter (a), with the counter (b) being loaded with time $t_4$ and counter (c) with time $t_5$.

If counter (b) with time $t_4$ is expired before an encoder change occurs, the frequency range $f_2$ is detected.

If counter (c) with time $t_5$ has expired before a change of the encoder signals occurs, the frequency range $f_3$ is detected.

Via the length and the frequencies of the post-trigger times $t_2, t_3 \ldots t_n$, and an appropriate number of available counter systems, with each of the shown frequency recognition systems or with a combination of both systems, any desired number of speed ranges can be realized with any desired number of frequency gradations.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for driving a self-timing stepping motor comprising:

starting the stepping motor by applying a first target step frequency until the stepping motor rotates at a corresponding speed V4;

defining at least one load detection threshold speed V3 which is lower than the speed V4, and a second target step frequency with a corresponding speed V5 which is greater than speed V4;

detecting a rotational speed of the stepping motor;

recognizing whether the detected rotational speed of the stepping motor has fallen below the load detection threshold speed V3 for a preset time interval due to an impressed external load on the stepping motor;

applying the second target step frequency when the detected rotational speed has fallen below the load detection threshold speed V3 for the preset time interval; and increasing the rotational speed of the stepping motor to the speed V5 corresponding to the second target step frequency after the impressed external load is removed from the stepping motor.

2. A method according to claim 1, wherein the speed V4 is about 300 mm/s and the load detection threshold speed V3 is about 225 mm/s.

3. A method according to claim 2, wherein the speed V5 is about 650 mm/s.

4. A method according to claim 1, wherein the speed V5 is about 650 mm/s.

5. A device for driving a self-timing stepping motor which can be decelerated by an eternal load, wherein the stepping motor can be started by applying a target step frequency, comprising:

driving means for driving the stepping motor;

means for determining the rotation speed of the stepping motor;

means for increasing the target step frequency when the rotational speed of the stepping motor falls below a load detection speed for a present time interval, the means for increasing coupled to the driving means;

means for defining at least one detection threshold speed V3, wherein the stepper motor initially rotates at a speed V4, the load detection threshold speed V3 being lower than the speed V4;

means for detecting whether the rotational speed of the stepping motor has fallen below the load detection threshold speed V3 due to an impressed external load on the stepping motor for a preset time interval; and means responsive to the detection of the rotational speed of the stepping motor falling below the load detection threshold speed V3 to cause an increase of the rotational speed of the stepping motor to a speed V5 which is greater than V4 after the external load is removed from the stepping motor.

6. A device according to claim 5, wherein the sheet front-feed device further includes a sensor device for the acquisition of the running-in of a sheet, the sensor device being disposed with respect to a sheet front-feed direction before the transfer roller and coupled with the driving means, and wherein the driving means starts the driving process of the stepping motor as soon as the run-in of a sheet is detected by the sensor device.

7. A device according to claim 6, wherein the sheet front-feed device further includes means connected with the driving means for determining the sheet length of a drawn-in sheet, wherein the sheet length is determined from the run-in of the sheet into the transfer rollers up to the run-out from the sensor device plus a preset step number which results from the distance of the sensor device to the transfer rollers.

8. A device according to claim 5, wherein a plurality of detection thresholds are presettable.

9. A device for driving a self-timing stepping motor which can be decelerated by an eternal load, wherein the stepping motor can be started by applying a target step frequency, and for being operatively associated with at least one transfer roller, wherein the stepping motors is disposed for driving the at least one transfer roller of a sheet front-feed device, and wherein the external load is formed by a sheet output device which releases sheets at a preset ejection speed, comprising:

driving means for driving the stepping motor;

means for determining the rotation speed of the stepping motor; and means for increasing the target step frequency when the rotational speed of the stepping motor falls below a load detection speed for a present time interval, the means for increasing coupled to the driving means;

means for defining at least one detection threshold speed V3, wherein the stepper motor initially rotates at a speed V4, the load detection threshold speed V3 being lower than the speed V4;

means for detecting whether the rotational speed of the stepping motor has fallen below the load detection threshold speed V3 due to an impressed external load on the stepping motor for a preset time interval; and means responsive to the detection of the rotational speed of the stepping motor falling below the load detection threshold speed V3 to cause an increase of the rotational speed of the stepping motor to a speed V5 which is greater than V4 after the external load is removed from the stepping motor.

10. A device according to claim 9, wherein the sheet front-feed device is implemented as document stacker unit.

11. A method for driving a stepping motor, the stepper motor causing the transferring of a paper document in a paper handling device, comprising:

detecting that the paper document is positioned to be received into the paper handling device;

starting the stepper motor in response to detecting the paper document, the stepper motor started at a first target frequency for causing the stepper motor to have an initial rotational speed;

detecting the actual rotational speed of the stepper motor;

applying a load to the stepper motor, the load being the paper document;

recognizing that the load has been applied to the stepper motor when the detected actual rotational speed falls below a load detection speed;

starting a timer responsive to recognizing that the load has been applied to the stepper motor;

waiting for a preset time to elapse on the timer; and setting the stepper motor to a second target frequency when the time elapses.

12. A device for driving a self-timing stepping motor which can be decelerated by an eternal load, wherein the stepping motor can be started by applying a target step frequency, comprising:

driving means for driving the stepping motor;

means for determining the rotation speed of the stepping motor;

means for increasing the target step frequency when the rotational speed of the stepping motor falls below a load detection speed for a present time interval, the means for increasing coupled to the driving means;

means for defining at least one detection threshold speed V3, wherein the stepper motor initially rotates at a speed V4, the load detection threshold speed V3 being lower than the speed V4;

means for detecting whether the rotational speed of the stepping motor has fallen below the load detection threshold speed V3 due to an impressed external load on the stepping motor for a preset time interval;

means responsive to the detection of the rotational speed of the stepping motor falling below the load detection threshold speed V3 to cause an increase of the rotational speed of the stepping motor to a speed V5 which is greater than V4 after the external load is removed from the stepping motor;

wherein said driving means includes a counter arrangement for step frequency control and step frequency recognition of the stepping motor; and wherein said driving means includes at least one microprocessor.

* * * * *